United States Patent
Algrim et al.

(10) Patent No.: US 6,897,265 B2
(45) Date of Patent: *May 24, 2005

(54) POLYESTER COIL COATING

(75) Inventors: Donald J. Algrim, Howell, MI (US); Daniel Calimente, Sterling Heights, MI (US); Andrew Dell, Highland, MI (US); David E. Lindow, Farmington Hills, MI (US)

(73) Assignee: BASF Corporation, Southfield, MI (US)

( * ) Notice: Subject to any disclaimer, the term of this patent is extended or adjusted under 35 U.S.C. 154(b) by 231 days.

This patent is subject to a terminal disclaimer.

(21) Appl. No.: 10/282,843

(22) Filed: Oct. 29, 2002

(65) Prior Publication Data

US 2004/0081850 A1 Apr. 29, 2004

(51) Int. Cl.⁷ .................. C08G 63/12; C08G 63/02; C08L 67/02
(52) U.S. Cl. .................. 525/444; 525/437; 525/461; 525/462; 525/466; 525/469
(58) Field of Search .................. 525/437, 444, 525/469, 461, 462, 466

(56) References Cited

U.S. PATENT DOCUMENTS

| | | | |
|---|---|---|---|
| 3,345,429 A | 10/1967 | Sattler et al. | |
| 4,734,467 A | 3/1988 | Yamada et al. | 525/440 |
| 4,968,775 A | * 11/1990 | Toman et al. | 528/272 |
| 5,380,816 A | * 1/1995 | Sullivan | 427/385.5 |
| 5,563,223 A | 10/1996 | Tachika et al. | 525/437 |
| 6,200,683 B1 | 3/2001 | Montagne et al. | |
| 6,413,648 B1 | 7/2002 | Heyenk et al. | 428/482 |
| 6,660,398 B1 | * 12/2003 | Moens et al. | 428/482 |
| 2004/0082733 A1 | * 4/2004 | Algrim et al. | 525/437 |

FOREIGN PATENT DOCUMENTS

| | | |
|---|---|---|
| EP | 0 397 484 A2 | 11/1990 |
| JP | 03259916 | 11/1991 |
| JP | 06287509 | 10/1995 |

* cited by examiner

*Primary Examiner*—Jeffrey B. Robertson

(57) ABSTRACT

A coil coating composition producing a coil coating with excellent properties at a lower peak metal temperature includes (a) a first, branched polyester prepared by condensation of a polyol component consisting essentially of a flexibilizing diol, 2-methyl-1,3-propanediol, and a polyol having at least three hydroxyl groups and an acid component consisting essentially of isophthalic acid; (b) a second, essentially linear polyester prepared by condensation of a polyol component consisting essentially of a flexibilizing diol and 2-methyl-1,3-propanediol and an acid component consisting essentially of isophthalic acid; and (c) a crosslinking agent.

16 Claims, No Drawings

POLYESTER COIL COATING

FIELD OF THE INVENTION

This invention concerns topcoat coil coating compositions. More specifically, the invention concerns thermosetting coil coating compositions, cured coil coatings derived therefrom, and substrates coated with such coatings. The invention further concerns a method for coil coating at an increased line speed.

BACKGROUND OF THE INVENTION

Coil coatings are applied to coiled sheet metal stock, such as steel or aluminum, in an economical, high speed process. The coil coating process results in a high quality, uniform coating with little waste of the coating and little generation of organic emissions as compared to other coating methods, e.g. spray application of a coating composition.

Coil coating is a continuous feeding operation, with the end of one coil typically being joined (e.g., stapled) to the beginning of a next coil. The coil is first fed into an accumulator tower and after coating is fed into an exit accumulator tower, with the accumulator towers allowing the coating operation to continue at constant speed even when intake of the steel is delayed, for example to start a new roll, or winding of the steel after coating is delayed, for example to cut the steel to end one roll and begin a new roll. The coil is generally cleaned to remove oil or debris, pre-treated, primed with a primer on both sides, baked to cure the primer, quenched to cool the metal, then coated on at least one side with a topcoat. A separate backer or a different topcoat may be applied on the other side. The topcoat is baked and quenched, then fed into the exit accumulator tower and from there is re-rolled.

One of the controlling factors for the coil coating line speed is the oven dwell time necessary to cure the applied coating at the cure oven temperature. A coating composition that can be cured in a shorter time at the oven temperature allows a faster and more economical coil coating process. A number of other properties are important for coil coatings, too, such as resistance to degradation on outdoor exposure (weatherability), chemical resistance, water resistance, scratch resistance, gloss, hardness, and resistance to delamination when the substrate is bent. The bending property is important because after being coated the metal is subjected to a forming step. For example, building panels are formed into a three-dimensional shape after coating. It is important that the coating not lose adhesion during the forming step or steps. Weatherability is important for metal that will be used for building panels, gutters, garage doors, sign stock, panels used for vehicle parts, or other such uses where the coated surface is exposed to outdoor weather and sun. While the bending property is generally better with softer, more flexible binders, weatherability and other durability properties are generally better with harder binders.

Various coil coating compositions have been proposed to be suitable for the coil coatings process and provide the different coating properties desired. For example, Heyenk et al., U.S. Pat. No. 6,413,648 B1 describes a thermosetting coating composition containing a mixture of two polymers, one of which is amorphous with a glass transition temperature greater than about 45° C. The polymers may be linear or branched polyacrylates or polyesters. Tachika et al., U.S. Pat. No. 5,563,223 describes a composition that balances the need for processability of the coating composition with the need for alkali resistance, gasket resistance, weatherability and resistance to staining in the cured coating. The composition contains a curing agent and a polyester prepared using an acid component that is at least 50 mole % aromatic dicarboxylic acid and a glycol component having 1–25 mole % 2-methyl-1,3-propanediol and 75–99 mole % alkylene glycol having 5 to 10 carbon atoms. Alternatively, the glycol component can be 20–85 mole % of alicyclic glycol, 80–15 mole % of the addition product of bisphenol A and alkylene oxide, and up to 50 mole % of other glycol(s). Sullivan, U.S. Pat. No. 5,380,816 discloses thermoset coating compositions containing linear polyesters consisting essentially of recurring units of isophthalic acid, an aliphatic diol component including 2-methyl-1,3-propanediol, and, optionally a further dicarboxylic acid. The cured coatings reportedly have improved flexibility and hardness, although it requires a cure time that is comparatively long for a coil coating. Toman et al., U.S. Pat. No. 4,968,775 discloses a thermosetting coil coating composition containing an aminoplast resin and a polyester prepared by condensation of 2-methyl-1,3-propanediol, neopentyl glycol, isophthalic acid, and terephthalic acid, and may contain 1,6-hexanediol or other symmetrical glycol, trimethylolpropane, adipic acid or other symmetrical aliphatic dicarboxylic acid, and/or trimellitic anhydride. The Toman composition is reportedly particularly resistant to crystallization. Finally, Yamada et al., U.S. Pat. No. 4,734,467 discloses a coil coating composition consisting essentially of a crosslinking component selected from melamine resin or isocyanate compound and a mixture of linear and branched polyester resins. The cured coating is reported to have desirable hardness, bending, processability, fastness to boiling water, weather resistance, chemical resistance, and marker stain resistance.

While these compositions offer certain advantages, the cure time remains a problem. A coating composition cures at a given peak metal temperature. While the peak metal temperature can be reached more quickly if the oven temperature is high, there are practical and economic limitations on how high the oven temperature can be. The Heyenk patent Example II of a coil coating has a curing cycle of 42 seconds at 358° C. (676° F.) to reach a peak metal temperature of 232> C. (450° F.) and Example VI provides a coil coating cured for 41 seconds at 300° C. (572° F.) to reach a peak metal temperature of 241° C. (466° F.). The Tachika patent example coatings, particularly topcoat, are cured for 60 seconds at 230° C. (446° F.). The Sullivan patent example coatings were reported as baked at 245° C. (473° F.) for 75 seconds or at 240° C. (464° F.) for 125 seconds. The Toman patent examples do not provide a cure schedule or peak metal temperature. The Yamada patent example coatings were reported as baked at 230° C. (446° F.) for 40 seconds. A reduction in these curing times would allow a faster, more economical coil coating process.

It would be advantageous to be able to fully cure the coil coating with a shorter dwell time, while maintaining adequate bending and other properties

SUMMARY OF THE INVENTION

The coil coating composition of the invention includes (a) a first, branched polyester prepared by condensation of a polyol component consisting essentially of a flexibilizing diol, 2-methyl-1,3-propanediol, and a polyol having at least three hydroxyl groups and an acid component consisting essentially of isophthalic acid or its anhydride or methyl ester; (b) a second, essentially linear polyester prepared by condensation of a polyol component consisting essentially of a flexibilizing diol and 2-methyl-1,3-propanediol and an acid component consisting essentially of isophthalic acid or its anhydride or polymerizable ester; and (c) a crosslinking agent.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value. The term "acid" when used in this description of the invention and in the claims to refer to a monomer in the polyester condensation encompasses the acid, its anhydride if it is possible to carry out the condensation with the corresponding anhydride, or any polymerizable ester of the acid (generally methyl esters), or any combination of these. "Binder" refers to the film-forming components of the cured coating or coating composition.

DETAILED DESCRIPTION OF THE PREFERRED EMBODIMENTS

The following description of the preferred embodiment(s) is merely exemplary in nature and is in no way intended to limit the invention, its application, or uses.

The coil coating composition of the invention includes a first, branched polyester, a second, essentially linear polyester, and a crosslinking agent.

The first, branched polyester is prepared by condensation of a polyol component and a polyacid component. The polyol component consists essentially of a flexibilizing diol, 2-methyl-1,3-propanediol, and a polyol having at least three hydroxyl groups. The flexibilizing diol has 4 or more main chain carbon atoms. Examples of suitable flexibilizing diols include, without limitation, α,ω-alkylene diols having four or more carbon atoms such as 1,4-butanediol and 1,6-hexanediol; diols containing cyclic moieties such as cyclohexanedimethanol; and longer chain diols, such as dimer fatty alcohol, and combinations of these. The polyol having at least three hydroxyl groups preferably has three or four hydroxyl groups. Preferred examples of the polyol having at least three hydroxyl groups include, without limitation, trimethylolethane, trimethylolpropane, pentaerthritol, and combinations of these.

From about 6.5% by weight to about 23% by weight of the flexibilizing diol or diols, from about 41% by weight to about 75% by weight of 2-methyl-1,3-propanediol, and from about 15% by weight to about 46% by weight of the polyol or polyols having at least three hydroxyl groups are included in the polyol component, based on the total combined weights of the flexibilizing diol or diols, 2-methyl-1,3-propanediol, and the polyol or polyols having at least three hydroxyl groups. Preferably, from about 8% by weight to about 20% by weight of the flexibilizing diol or diols, from about 45% by weight to about 65% by weight of 2-methyl-1,3-propanediol, and from about 20% by weight to about 40% by weight of the polyol or polyols having at least three hydroxyl groups are included in the polyol component, based on the total combined weights of the flexibilizing diol or diols, 2-methyl-1,3-propanediol, and the polyol or polyols having at least three hydroxyl groups. Even more preferably, from about 10% by weight to about 15% by weight of the flexibilizing diol or diols, from about 50% by weight to about 60% by weight of 2-methyl-1,3-propanediol, and from about 20% by weight to about 30% by weight of the polyol or polyols having at least three hydroxyl groups are included in the polyol component, based on the total combined weights of the flexibilizing diol or diols, 2-methyl-1,3-propanediol, and the polyol or polyols having at least three hydroxyl groups.

The polyol component may optionally also include up to about 5% by weight, based on the total weight of the polyol component, of one or more further polyols, so long as such polyols do not materially increase the cure schedule of the coating composition or materially diminish the flexibility of the cured coating, as measured by the T-bend test. Examples of such other polyols include, without limitation, ethylene glycol, diethylene glycol, neopentyl glycol, 1,3-butanediol, 1,3-propanediol, 1,2-propanediol, 2-ethyl-2-butyl-1,3-propanediol, trimethylpentanediol, hydroxypivalic neopentyl glycol ester, and combinations thereof.

The acid component consists essentially of isophthalic acid. (As mentioned before, "acid" is used herein with respect to monomers to include the acid monomer as well as its anhydride and any polymerizable esters.) While the acid component may include up to about 5 weight percent of other acid or anhydride monomers, preferably at least about 98 weight percent, more preferably at least about 99 weight percent, of the acid component is isophthalic acid. The large amount of isophthalic acid (and/or isophthalic anhydride or polymerizable esters of isophthalic acid) provides improved weathering properties as compared to other aromatic acid components or-aliphatic acid components.

The acid component may optionally include up to about 5 weight percent of other acid monomers, based on the total weight of the acid component. Examples of such other acid monomers include, without limitation, terephthalic acid, dimethyl terephthalate, adipic acid, glutaric acid, maleic acid, succinic acid, azelaic acid, sebacic acid, hexahydroterephthalic acid, decane dicarboxylic acid, 5-6-butylisophthalic acid, dimer fatty acids, phthalic anhydride, tetrahydrophthalic anhydride, succinic anhydride, maleic anhydride, trimellitic anhydride, pyromellitic anhydride, and hexahydrophthalic anhydride, and combinations of such monomers.

The polyester synthesis may be carried out under suitable, well-known conditions, for example at temperatures from about 150 to about 250° C., with or without catalyst (e.g., dibutyl tin oxide, tin chloride, butyl chlorotin dihydroxide, or tetrabutyoxytitanate), typically with removal of the by-product water (e.g., by simple distillation, azeotropic distillation, vacuum distillation) to drive the reaction to completion.

The branched polyester has an hydroxyl number of from about 100 to about 160 mg KOH/gram nonvolatile, preferably from about 115 to about 145 mg KOH/gram nonvolatile, and more preferably from about 125 to about 135 mg KOH/gram nonvolatile.

The branched polyester has a number average molecular weight preferably from about 2800 to about 3600, more preferably from about 2950 to about 3300; a weight average molecular weight preferably from about 5400 to about 8000, more preferably from about 5500 to about 7500; and a polydispersity preferably from about 1.7 to about 2.5, more preferably from about 1.9 to about 2.2. Number average molecular weight, weight average molecular weight, and the polydispersity index may be determined by standard GPC (gel permeation chromatography) methods using polystyrene standards.

The second, essentially linear polyester is prepared by condensation of a polyol component and a polyacid component, with the polyol component consisting essentially of a flexibilizing diol and 2-methyl-1,3-propanediol.

The flexibilizing diol has 4 or more main chain carbon atoms. Examples of suitable flexibilizing diols include, without limitation, α,ω-alkylene diols having four or more carbon atoms such as 1,4-butanediol and 1,6-hexanediol; diols containing cyclic moieties such as cyclohexanedimethanol; and longer chain diols, such as dimer fatty alcohol, and combinations of these. The same flexibilizing diol or combination of flexibilizing diols may be used for both the first and the second polyester, or different flexibilizing diols may be used to each From about 22% by weight to about 50% by weight of the flexibilizing diol or diols and from about 78% by weight to about 50% by weight of 2-methyl-1,3-propanediol, based on the total combined weights of the flexibilizing diol or diols and 2-methyl-1,3-propanediol, are included in the polyol component. Preferably, from about 25% by weight to about 45% by weight of the flexibilizing diol or diols and from about 55% by weight to about 75% by weight of 2-methyl-1,3-propanediol are included in the polyol component, based on the total combined weights of the flexibilizing diol or diols and 2-methyl-1,3-propanediol. Even more preferably, from about 30% by weight to about 40% by weight of the flexibilizing diol or diols and from about 60% by weight to about 70% by weight of 2-methyl-1,3-propanediol are included in the polyol component, based on the total combined weights of the flexibilizing diol or diols and 2-methyl-1,3-propanediol.

The polyol component may optionally also include up to about 5% by weight, based on the total weight of the polyol component, of one or more further polyols, so long as such polyols do not materially increase the cure schedule of the coating composition or materially diminish the flexibility of the cured coating, as measured by the T-bend test. Examples of such other polyols include, without limitation, ethylene glycol, diethylene glycol, neopentyl glycol, 1,3-butanediol, 1,3-propanediol, 1,2-propanediol, 2-ethyl-2-butyl-1,3-propanediol, trimethylpentanediol, hydroxypivalic neopentyl glycol ester, trimethylolethane, trimethylolpropane, pentaerthritol, and combinations thereof.

The acid component again consists essentially of isophthalic acid (including isophthalic anhydride and polymerizable esters of isophthalic acid). While the acid component may include up to about 5 weight percent of other acid monomers, preferably at least about 98 weight percent, more preferably at least about 99 weight percent, of the acid component is isophthalic acid. The large amount of isophthalic acid provides improved weathering properties as compared to other aromatic acid components or aliphatic acid components.

The acid component may optionally include up to about 5 weight percent of other acid monomers, based on the total weight of the acid component. Specific examples of such other acid monomers include, without limitation, terephthalic acid, dimethyl terephthalate, adipic acid, glutaric acid, maleic acid, succinic acid, azelaic acid, sebacic acid, hexahydroterephthalic acid, decane dicarboxylic acid, 5-6-butylisophthalic acid, dimer fatty acids, phthalic anhydride, tetrahydrophthalic anhydride, succinic anhydride, maleic anhydride, trimellitic anhydride, pyromellitic anhydride, hexahydrophthalic anhydride, and combinations of such monomers.

The second polyester synthesis may again be carried out under suitable, well-known conditions, for example as described above in connection with the first, branched polyester The second, essentially linear polyester has an hydroxyl number of from about 35 to about 75 mg KOH/gram nonvolatile, preferably from about 40 to about 65 mg KOH/gram nonvolatile, and more preferably from about 45 to about 60 mg KOH/gram nonvolatile.

The second, essentially linear polyester has a number average molecular weight preferably from about 3800 to about 5200, more preferably from about 4000 to about 5100; a weight average molecular weight preferably from about 5400 to about 8000, more preferably from about 6000 to about 7600; and a polydispersity preferably from about 1.3 to about 2.1, more preferably from about 1.4 to about 1.7.

The coating composition further includes a crosslinking agent. The crosslinking agent has three or more groups reactive with the hydroxyl functionality of the polyesters. Suitable crosslinking agents include, without limitation, aminoplasts and isocyanate crosslinking agents. Examples of suitable aminoplast crosslinkers are benzoguanamine, melamine-formaldehyde, and urea-formaldehyde resins. The polyester:aminoplast weight ratio is generally between 95:5 and 75:35 (based on solid resin). Particularly preferred are melamine formaldehyde resins, especially fully alkylated, monomeric melamine formaldehyde resins, and blocked polyisocyanates, especially blocked aliphatic isocyanurates such as the isocyanurates of isophorone diisocyanate or hexamethylene diisocyanate blocked with, for example, methyl ethyl ketoxime. A mixture of crosslinking agents may be used.

The coating composition may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluene sulfonic acid, methane sulfonic acid, nonylbenzene sulfonic acid, dinonylnaphthalene disulfonic acid, dinonylnaphthalene sulfonic acid, dodecylbenzenesulfonic acid, phenyl acid phosphate, monobutyl maleate, butyl phosphate, monoalkyl and dialkyl acid phosphates, and hydroxy phosphate ester. Strong acid catalysts may be blocked, e.g. with an amine. Other catalysts that may be useful in the composition of the invention include Lewis acids, zinc salts, and tin salts. Catalysts are generally included in amounts of from about 0.1 to about 5.0 weight percent, based on the binder weight.

The branched polyester, the essentially linear polyester, and the crosslinking agent are included in the binder in amounts (based on nonvolatile weights) of from about 5% by weight to about 25% by weight of the branched polyester, from about 60% by weight to about 80% by weight of the essentially linear polyester, and from about 5% by weight to about 25% by weight of the crosslinking agent, based on the total combined nonvolatile weights of the branched polyester, the essentially linear polyester, and the crosslinking agent. Preferably, the branched polyester, the essentially linear polyester, and the crosslinking agent are included in the binder in amounts (based on nonvolatile weights) of from about 10% by weight to about 20% by weight of the branched polyester, from about 65% by weight to about 75% by weight of the essentially linear polyester, and from about 10% by weight to about 20% by weight of the crosslinking agent, based on the total combined nonvolatile weights of the branched polyester, the essentially linear polyester, and the crosslinking agent.

The coating composition of the invention typically further includes a pigment. The pigment may be any organic or inorganic compounds or colored materials used as pigments, metallic or other inorganic flake materials such as pearlescent mica flake pigments or metallic flake pigments such as aluminum flake, and other materials of kind that the art normally includes in coatings as pigments. Examples of typical fillers that may be included in the coating are talc and barytes. Pigments and other insoluble particulate compounds such as fillers are usually used in the composition in an amount of 1% to 100%, based on the total solid weight of binder components (i.e., a pigment-to-binder ratio of 0.1 to 1). The pigment is generally pre-dispersed (as a "pigment grind" or "pigment paste"), generally in a portion of the second (linear) polyester, using typical dispersion equipment such as a sand mill, roller mill, or attritor.

Additional agents, for example surfactants, stabilizers, wetting agents, rheology control agents and flow modifiers, surface modifying agents such as to enhance resistance to staining, scratching, or marring, dispersing agents, adhesion promoters, UV absorbers, hindered amine light stabilizers, etc. may be incorporated into the coating composition. While such additives are well-known in the prior art, the amount used must be controlled to avoid adversely affecting the coating characteristics.

One or more solvents may be utilized in the coating composition of the present invention. In general, the solvent can be any organic solvent and/or water. Examples of useful solvents include, without limitation, aromatic hydrocarbons, ketones, esters, glycol ethers, and esters of glycol ethers. Specific examples include, without limitation, methyl ethyl ketone, methyl isobutyl ketone, m-amyl acetate, ethylene glycol butyl ether and ethylene glycol monobutyl ether acetate, propylene glycol monomethyl ether and propylene glycol monomethyl ether acetate, xylene, N-methylpyrolidone, blends of aromatic hydrocarbons, and mixtures of these.

Coil coatings are typically cured through short dwell times in an oven to reach a desired peak metal temperature. The temperature of the oven is usually significantly higher than the desired peak metal temperature to shorten the necessary dwell time. The coil coating compositions of the invention advantageously are sufficiently cured at a peak metal temperature of about 360° F. (182° C.) to about 380° F. (193° C.) to develop the desired coil coating properties, although they are robust enough to be curable at temperatures as high as 450° F. (232° C.) without significant decrease in coating properties.

The coating composition of the invention is applied by a coil coating process to a metal coil stock. Suitable metal coil stock includes, for example and without limitation, steel, tin-plated steel, and aluminum. The coating composition of the invention is preferably a topcoat, and is applied to the coil stock following application of a primer layer. The coating composition could also be applied as a single coat without a separate primer layer, which may be done for example for aluminum. The coating composition could also be formulated as a primer composition, e.g. by using pigments typical of primers and additives e.g. for adhesion. The coating composition could also be applied as a "backer" coating, a coating applied to the back or reverse side of a coil. The applied coating is cured to provide a cured coil coating on the metal coil.

The invention is further described in the following example. The examples are merely illustrative and do not in any way limit the scope of the invention as described and claimed. All parts are parts by weight unless otherwise noted.

EXAMPLE 1

Preparation of Branched Polyester

A reactor fitted with a fractionating column, condenser, and decanter is charged with 367 parts by weight 1,6-hexanediol, 1589.7 parts by weight 2-methyl-1,3-propanediol, 721.1 parts by weight of trimethylolpropane, 6.1 parts by weight FASCAT 4100 catalyst (butyl tin hydroxide oxide hydrate, obtained from Atofina Chemicals), 20.0 parts by weight terephthalic acid, and 3634.3 parts by weight isophthalic acid. The contents of the flask were heated to 180° C. and maintained at that temperature for two hours, maintaining the fractionator head temperature at 100° C. The batch was then heated to 195° C. and held for an additional hour. The batch was next heated to 213° C. until the head temperature of the fractionator dropped to 90° C. The fractionating column was then by-passed and the batch was switched to reflux from the condenser into the decanter. A nitrogen sparge was applied to assist in the removal of water. The batch was held at reflux until it reached a Gardner Holt viscosity of U at 50% in dipropylene glycol monomethyl ether and an acid number of 7.3 mg KOH/nonvolatile. The polyester was reduced with 1830.5 of Aromatic 150, added in three parts, and 1830.5 parts by weight of dipropylene glycol monomethyl ether, added in two parts. The product polyester had nonvolatiles of 60.8% by weight, a Gardner-Holt viscosity of Z1+, an acid number on nonvolatiles of 7.3 mg KOH/gNV, and an hydroxyl number of 126 mg KOH/g NV.

EXAMPLE 2

Preparation of Linear Polyester

A reactor fitted with a fractionating column, condenser, and decanter was charged with 964 parts by weight 1,6-hexanediol, 1736.4 parts by weight 2-methyl-1,3-propanediol, 14.9 parts by weight of trimethylolpropane, 6.4 parts by weight FASCAT 4100 catalyst, 4089.2 parts by weight isophthalic acid, and 7.5 parts by weight terephthalic acid. The contents of the reactor were heated to 185° C. and maintained at that temperature for two hours, maintaining the fractionator head temperature at 100° C. The batch was next heated to 230° C. and held until the head temperature of the fractionator dropped to 90° C. The fractionating column was then by-passed, the batch was switched to reflux from the condenser into the decanter and 222.9 parts by weight Aromatic 100 was added to the reactor to aid in removing the water azeotropically. When the batch reached a Gardner Holt viscosity of R at 60% by weight nonvolatile dilution in xylene and an acid number of 1.4 mg KOH/nonvolatile, the polyester was reduced with 1684.1 parts by weight Aromatic 150 and 1274.1 parts by weight ethylene glycol monobutyl ether. The product polyester had nonvolatiles of 65% by weight, Gardner Holt viscosity of Z2, acid number on nonvolatiles of 1.4 mg KOH/gNV, and hydroxyl number of 52 mg KOH/g NV.

EXAMPLE 3

White Coil Coating Topcoat

First, a titanium dioxide dispersion was made by blending together 17.32 parts by weight Example 2 polyester, 4.0 parts by weight Aromatic 100, and 31.98 parts by weight titanium dioxide pigment. The mixture was ground to a fineness of 7.5 on a Hegman grind gauge in a shaker mill with glass beads. The titanium dioxide dispersion was formulated into a topcoat coil coating by adding 19.7 parts by weight Example 2 polyester, 5.6 parts by weight Resimene 747 (obtained from Solutia, St. Louis, Mo.), 1.5 parts by weight butanol, 4.0 parts by weight dipropylene glycol monomethyl ether, 1.5 parts by weight butyl acetate, 4.5 parts by weight Aromatic 100, 0.2 parts by weight of a polyolefin additive 0.33 parts by weight Aromatic 100, 0.5 parts by weight of an acrylic flow modifier resin, 0.4 parts by weight Nacure 1051 (an unblocked dinonylnaphthylene sulfonic acid), and 9.0 parts by weight Example 1 branched polyester.

Comparative Example A

White Coil Coating Topcoat Without Branched Polyester

First, a titanium dioxide dispersion was made by blending together 17.32 parts by weight Example 2 polyester, 4.0 parts by weight Aromatic 100, and 31.98 parts by weight titanium dioxide pigment. The mixture was ground to a fineness of 7.5 on a Hegman grind gauge in a shaker mill with glass beads. The titanium dioxide dispersion was formulated into a topcoat coil coating by adding 28.1 parts by weight Example 2 polyester, 5.7 parts by weight Resimene 747 (obtained from Solutia, St. Louis, Mo.), 1.5 parts by weight butanol, 4.0 parts by weight dipropylene glycol monomethyl ether, 1.5 parts by weight butyl acetate, 4.5 parts by weight Aromatic 100, 0.2 parts by weight of a polyolefin additive 1.0 part by weight Aromatic 100, 0.5 parts by weight of an acrylic flow modifier resin, 0.4 parts by weight of an unblocked dinonylnaphthylene sulfonic acid, and 0.5 parts by weight Nacure 1051 (an unblocked dinonylnaphthylene sulfonic acid).

The coatings of Example 3 and Comparative Example A were tested by applying each coating with a wire-wrapped draw bar according to ASTM D 4147-93 on a 4"×8"×0.025" CRS panel with a 902 pretreatment (supplied by Henkel) and curing the coating to produce a cured thickness of 0.7–0.8 mil at different cure schedules in a 550° F. (288° C.) oven for different times to reach metal temperatures of 360° F. (182° C.) (about 17 seconds dwell time in the oven), 380° F. (193° C.) (about 20 seconds dwell time), 400° F. (204° C.) (about 24 seconds dwell time), 420° F. (216° C.) (about 30 seconds dwell time), and 450° F. (232° C.) (about 35 seconds dwell time).

The cured coatings were tested by the following test methods.

Methyl ethyl ketone doublerubs was tested by National Coil Coaters Association Technical Bulletin No. II-18 (May, 1980).

Pencil Hardness was tested according to ASTM D3363-00.

Fischer microhardness was tested using a Fischer microhardness tester, Fischerscope® H100C, using 300 milliNewtons force for a 20 second test period with the indenter applied to the surface of the coating.

Flexibility was tested by the T-bend test. The T-bend test according to ASTM D 4145-83.

Humidity was tested according to ASTM D 4585-92.

QUV testing was conducted according to ASTM G 53. Gloss was measured by ASTM D 523-89 before and after QUV testing and the percentage gloss retained was calculated.

The test results are shown in the following table.

|  | Example 3 | | | | | Comparative Example A | | | | |
| --- | --- | --- | --- | --- | --- | --- | --- | --- | --- | --- |
| Peak Metal Temperature (° F.) | 360 | 380 | 400 | 420 | 450 | 360 | 380 | 400 | 420 | 450 |
| MEK doublerubs | >100 | >100 | >100 | >100 | >100 | >100 | >100 | >100 | >100 | >100 |
| Pencil Hardness | F | H | H | 2H | 2H | HB | F | F | H | H |
| Fischer microhardness | 86 | 193 | 215 | 243 | 260 | 73 | 87 | 111 | 156 | 187 |
| T-bend test | 0T | 0T | 0T | 0T | 1T | 0T | 0T | 0T | 0T | 0T |
| 1000 hours humidity | — | 9.5 | 9.5 | 10 | 10 | — | (not fully cured) | 9.0 | 9.0 | 10 |
| Gloss retention after QUV testing (750 hours) | — | 94.8 | 97.6 | 99.5 | 100.2 | — | 88.1 | 90.7 | 93.4 | 105.5 |

The test results demonstrate that the coating composition of the invention can be cured at a peak metal temperature of 380° F. or less, with considerable reduction in dwell time (less than half the dwell time needed to reach a peak metal temperature of 450° F.).

The invention has been described in detail with reference to preferred embodiments thereof. It should be understood, however, that variations and modifications can be made within the spirit and scope of the invention.

What is claimed is:

1. A coil coating composition comprising:
   (a) a first polyester prepared by condensation of a polyol component consisting essentially of a flexibilizing diol, 2-methyl-1,3-propanediol, and a polyol having at least three hydroxyl groups and an acid component consisting essentially of isophthalic acid;
   (b) a second polyester prepared by condensation of a polyol component consisting essentially of a flexibilizing diol and 2-methyl-1,3-propanediol and an acid component consisting essentially of isophthalic acid; and
   (c) a crosslinking agent.

2. A coil coating composition according to claim 1, wherein the flexibilizing diol of the first polyester and the flexibilizing diol of the second polyester are each independently selected from the group consisting of α,ω-alkylene diols having four or more carbon atoms, diols containing cyclic moieties, dimer fatty alcohol, and combinations thereof.

3. A coil coating composition according to claim 1, wherein the flexibilizing diol of the first polyester and the flexibilizing diol of the second polyester are each independently selected from the group consisting of 1,4-butanediol, 1,6-hexanediol, cyclohexanedimethanol, dimer fatty alcohol, and combinations thereof.

4. A coil coating composition according to claim 1, wherein the polyol having at least three hydroxyl groups is selected from the group consisting of trimethylolethane, trimethylolpropane, pentaerthritol, and combinations thereof.

5. A coil coating composition according to claim 1, wherein the polyol component of the first polyester consists essentially of
from about 6.5% by weight to about 23% by weight of the flexibilizing diol,
from about 41% by weight to about 75% by weight of 2-methyl-1,3-propanediol, and
from about 15% by weight to about 46% by weight of the polyol having at least three hydroxyl groups,
based on the total combined weights of the flexibilizing diol, 2-methyl-1,3-propanediol, and the polyol having at least three hydroxyl groups.

6. A coil coating composition according to claim 1, wherein the polyol component of the first polyester consists essentially of
from about 8% by weight to about 20% by weight of the flexibilizing diol,
from about 45% by weight to about 65% by weight of 2-methyl-1,3-propanediol, and
from about 20% by weight to about 40% by weight of the polyol having at least three hydroxyl groups,
based on the total combined weights of the flexibilizing diol, 2-methyl-1,3-propanediol, and the polyol having at least three hydroxyl groups.

7. A coil coating composition according to claim 1, wherein the polyol component of the first polyester consists essentially of
from about 10% by weight to about 15% by weight of the flexibilizing diol,
from about 50% by weight to about 60% by weight of 2-methyl-1,3-propanediol, and
from about 20% by weight to about 30% by weight of the polyol having at least three hydroxyl groups,
based on the total combined weights of the flexibilizing diol, 2-methyl-1,3-propanediol, and the polyol having at least three hydroxyl groups.

8. A coil coating composition according to claim 1, wherein the first polyester has an hydroxyl number of from about 100 to about 160 mg KOH/gram nonvolatile.

9. A coil coating composition according to claim 1, wherein the first polyester has a number average molecular weight from about 2800 to about 3600 and a weight average molecular weight from about 5400 to about 8000.

10. A coil coating composition according to claim 1, wherein the polyol component of the second polyester consists essentially of
from about 22% by weight to about 50% by weight of the flexibilizing diol and
from about 50% by weight to about 78% by weight of 2-methyl-1,3-propanediol,
based on the total combined weights of the flexibilizing diol and 2-methyl-1,3-propanediol.

11. A coil coating composition according to claim 1, wherein the polyol component of the second polyester consists essentially of
from about 25% by weight to about 45% by weight of the flexibilizing diol and
from about 55% by weight to about 75% by weight of 2-methyl-1,3-propanediol,
based on the total combined weights of the flexibilizing diol and 2-methyl-1,3-propanediol.

12. A coil coating composition according to claim 1, wherein the polyol component of the second polyester consists essentially of
from about 30% by weight to about 40% by weight of the flexibilizing diol and
from about 60% by weight to about 70% by weight of 2-methyl-1,3-propanediol,
based on the total combined weights of the flexibilizing diol and 2-methyl-1,3-propanediol.

13. A coil coating composition according to claim 1, wherein the second polyester has an hydroxyl number of from about 35 to about 75 mg KOH/gram nonvolatile.

14. A coil coating composition according to claim 1, wherein the second polyester has a number average molecular weight from about 3800 to about 5200 and a weight average molecular weight from about 5400 to about 8000.

15. A coil coating composition according to claim 1, wherein the crosslinking agent comprises a melamine formaldehyde resin and wherein the composition further comprises a strong acid catalyst.

16. A coil coating composition according to claim 1, comprising
about 5% by weight to about 25% by weight of the first polyester;
about 60% by weight to about 80% by weight of the second polyester; and
about 5% by weight to about 25% by weight of the crosslinking agent,
based on the total combined nonvolatile weights of the first polyester, the second polyester, and the crosslinking agent.

* * * * *